United States Patent [19]

Yoshino et al.

[11] 4,449,574

[45] May 22, 1984

[54] VENTILATION DEVICE

[75] Inventors: Masataka Yoshino; Yoshiki Hashimoto; Yasunori Ushikosi, all of Nakatsugawa, Japan

[73] Assignee: Mitsubishi Denki Kabushiki Kaisha, Tokyo, Japan

[21] Appl. No.: 394,863

[22] Filed: Jul. 2, 1982

[30] Foreign Application Priority Data

Oct. 23, 1981 [JP] Japan .......................... 56-157997[U]
Oct. 23, 1981 [JP] Japan .......................... 56-157998[U]
Oct. 23, 1981 [JP] Japan .......................... 56-157999[U]
Oct. 23, 1981 [JP] Japan .......................... 56-158000[U]

[51] Int. Cl.³ .......................................... G01K 13/00
[52] U.S. Cl. .................................. 165/11 R; 374/148; 374/189
[58] Field of Search .................. 62/129, 130, 127; 236/94, DIG. 6; 165/11 R; 374/110, 147, 148, 189, 208

[56] References Cited

U.S. PATENT DOCUMENTS

| | | | |
|---|---|---|---|
| 1,161,254 | 11/1915 | Scanes et al. | 374/148 |
| 1,561,659 | 11/1925 | Nichols | 374/189 |
| 3,113,501 | 12/1963 | Cargo . | |
| 4,217,761 | 8/1980 | Cornaire et al. | 165/11 R |
| 4,352,290 | 10/1982 | Neils | 374/110 |

FOREIGN PATENT DOCUMENTS 2650 6/1979 European Pat. Off. .
1300002 12/1972 United Kingdom .

*Primary Examiner*—Albert J. Makay
*Assistant Examiner*—Harry Tanner
*Attorney, Agent, or Firm*—Oblon, Fisher, Spivak, McClelland & Maier

[57] ABSTRACT

A ventilation device including a heat exchanger having thermosensitive elements each placed, respectively at the inlet of an air-feeding passage, the inlet of an air-discharging passage and the outlet of the air-feeding passage and a display unit for showing temperature detected by the respective thermosensitive elements.

4 Claims, 10 Drawing Figures

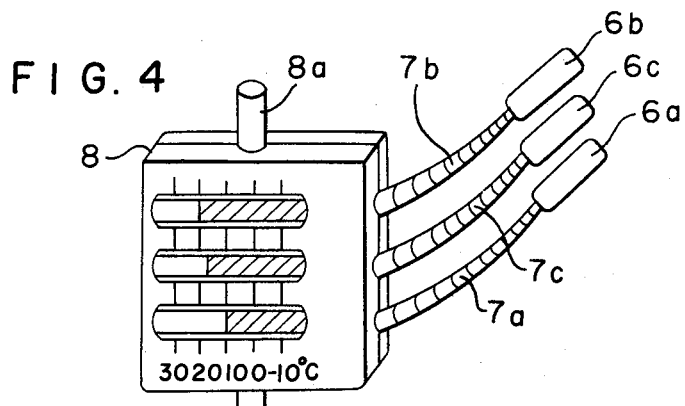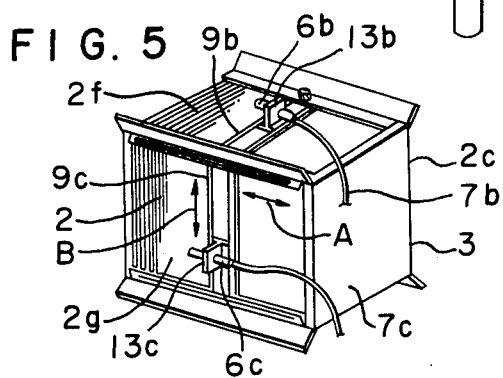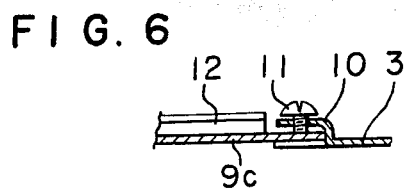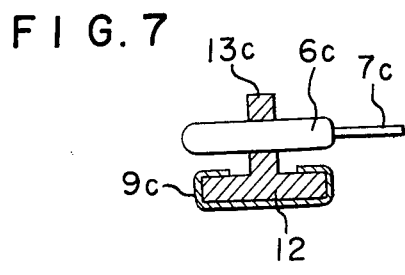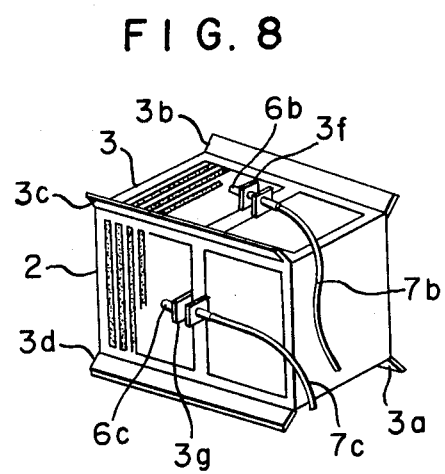

VENTILATION DEVICE

BACKGROUND OF THE INVENTION

1. Field of the Invention

The present invention relates to an improvement in a ventilation device having a heat exchanger.

2. Description of the Prior Art

There has been no ventilation device which includes a display means such as a thermometer for showing to a user temperatures of a fresh environmental air which is fed into a room after heat-exchange and of a room air to be discharged outside.

It is, therefore, necessary to show data such as an efficiency for heat exchange of room temperature to outdoor temperature on a material such as catalogue or technical information whereby effect of the heat exchange is informed to a user, thus the user relies on the ventilation device. It is especially desirable for a user to be able to observe himself a temperature difference in use of the ventilation device.

SUMMARY OF THE INVENTION

The present invention discloses a ventilation device which includes thermosensitive elements detecting, respectively, temperature of air in the outdoor, air in a room and air fed into the room through the ventilation device, and a display unit for showing temperature detected by each thermosensitive element.

It is an object of the present invention to provide a ventilation device which feeds a fresh air from the outdoor into a room without causing any effect to a room temperature and which allows direct observation of such a device to increase reliability for a user.

The foregoing and the other objects of the present invention have been attained by providing a ventilation device which comprises thermosensitive elements each placed at the inlet of an air-feeding passage, the inlet of an air-discharging passage and the outlet of the air-feeding passage and a display unit for showing temperature detected by the respective thermosensitive element.

In an embodiment of the present invention, a display unit for showing temperature detected is supported so as to be slanted to the outer surface of the ventilation device whereby a user can easily and directly observe the display unit by changing the direction of the unit dependent upon the position of the ventilation device.

The thermosensitive elements are slidably placed on the respective region and are fixed at a desired position in that region.

In another embodiment of the present invention, the thermosensitive elements can be easily fitted without using any special fitting part.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 4 is a schematic view of another embodiment of the display unit of the present invention;

FIG. 5 is a perspective view of an embodiment of the frame of the present invention;

FIGS. 6 and 7 are respectively enlarged cross sectional views of an important part of the frame;

FIG. 8 is a schematic view of another embodiment of the frame of the present invention.

DETAILED DESCRIPTION OF THE PREFERRED EMBODIMENTS

Figure 1:
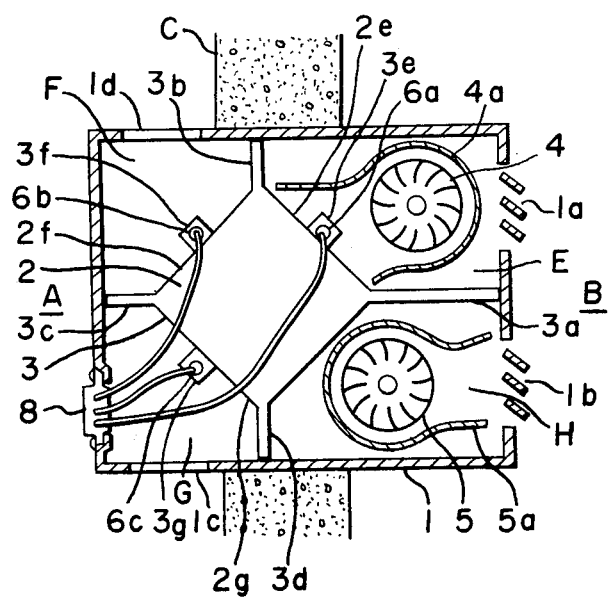
FIG. 1 is a cross sectional view of an embodiment of the ventilation device of the present invention.

Preferred embodiments of the present invention will be described with reference to drawings in which the same reference numerals designate the same or corresponding parts.

Figure 3:
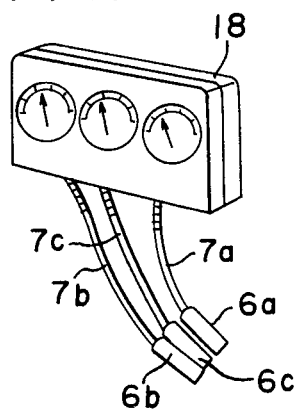
FIGS. 2 and 3 are respectively schematic views of embodiments of the display unit as an important part of the ventilation device of the present invention.
Figure 2:
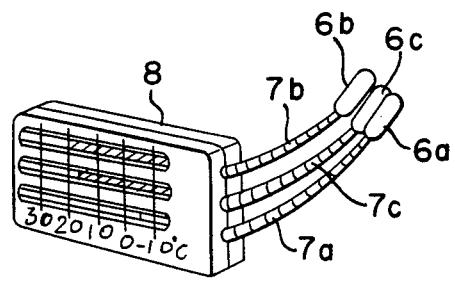

In FIGS. 1, 2 and 3, the reference numeral (1) designates a main casing fixed to a partition wall (C); (2) designates a heat exchanger which is placed in the casing (1) and has an outer periphery defined by a frame (3), the heat exchanger including the inlet plane (2e) of an air-feeding passage, the inlet plane (2f) of an air-discharging passage and the outlet plane (2g) of an air-feeding passage; (3a), (3b), (3c) and (3d) respectively designate partitions extending from each edge of the frame (3) to the inner wall of the casing (1) so as to divide the space of the casing (1). These partitions (3a)-(3d) and the heat exchanger (2), thus completely define the air passage in the casing to form the inlet of an air-feeding passage (E), the inlet of an air-discharging passage (F), the outlet of the air-feeding passage (G) and the outlet of the air-discharging passage (H). (3e), (3f) and (3g) designate legs for holding the thermosensitive elements at predetermined positions of the frame (3), the leg (3e) being fitted facing the inlet of the air-feeding passage (E), the leg (3f) being fitted facing the inlet of the air-discharging passage (F) and the leg (3g) being fitted facing the outlet of the air-feeding passage (G).

The reference numeral (4) designates an air-feeding blower which is driven by a motor and placed at the inlet of the air-feeding passage (E) and which serves to suck air (B) outside of the room through a louver (1a), to pass the air under the guiding of a casing (4a) and to feed it into a room A via the heat exchanger (2) through a discharge port (1c). (5) designates a discharging blower which is placed in parallel to the air-feeding blower at the outlet of the air-discharging passage (H) and which serves to suck air A in a room through an intake opening (1d), to pass the air through the heat exchanger (2) and to discharge it out of the room (toward B) from a louver (1b) under the guiding of a casing (5a).

The reference numerals (6a), (6b) and (6c) designate thermosensitive elements each fitted to the legs (3e), (3f) and (3g); (7a), (7b) and (7c) designate guide tubes each having one end connected to the thermosensitive element (6a), (6b) or (6c) and the other end connected to a thermometer unit described just below; (8) designates a thermometer unit as a display unit for displaying temperatures which are detected by the thermosensitive elements (6a)–(6c). The thermometer unit (8) is placed on the front surface of the main casing (1) to be convenient for the observation and can be provided with three stick-like thermometers which display temperature detected by the respective thermosensitive elements (6a)–(6c). The thermometer can be so fabricated that letters of "outdoor temperature" are labeled for a thermometer corresponding to the thermosensitive element (6a), "room temperature" is labeled for that corresponding to the thermosensitive element (6b) and "fed air temperature" is labeled for that corresponding to the thermosensitive element (6c) whereby temperature in each region can be compared.

When the ventilation device having the structure described above is operated, air from the outdoor is guided by the casing (4a) to the heat exchanger (2). Before passing through the heat exchanger (2), the temperature of the air is detected by the thermosensitive element (6) fitted at the inlet of the air-feeding passage (E). The air, after heat-exchange, is passed to the outlet of the air-feeding passage (G) where the temperature of the air is detected by the thermosensitive element (6c), while air discharged from the room is fed to the inlet of the air-discharging passage (F) where the temperature of the air is detected by the thermosensitive element (6b). The temperatures thus detected are displayed on the thermometer unit (8).

A user of the ventilation device can easily read and compare the temperatures on the thermometer unit (8). According to the ventilation device of the embodiment of the present invention, the user discriminates himself that a fresh air is heat-exchanged and ventilated without disturbing temperature condition in the room, that is, the air is not fed into the room without heat-exchanging. Reliability on the ventilation device can be increased without necessity of requiring explanation on a catalogue.

In the example of the ventilation device, the thermometer unit (8) including three stick-like thermometers as a display unit. A thermometer unit (18) of a liquid expansion type (FIG. 3) which shows temperature for several portions by indication of a pointer, can be used to obtain the same effect as the former embodiment.

In accordance with the embodiment of the ventilation device of the present invention, thermosensitive elements are respectively fitted at the inlet and the outlet of the air-feeding passage and the inlet of the air-discharging passage and a display unit is attached to show temperature detected by the respective thermosensitive elements. With this structure, a user of the ventilation device can directly read the temperature in separate portions to recognize to be a ventilation device capable of effective heat exchange thereby improving reliability on the device.

FIG. 4 illustrates another embodiment of a thermometer unit (8). A pair of pivotal shafts (8a) are provided at the vertical center of the thermometer unit (8). The pivotal shafts (8a) are pivotally fitted to the main casing (1) whereby the thermometer unit (8) can be turned with a predetermined angle to the left and right side in connection with the front surface of the casing (1). If the pivotal shafts (8a) of the thermometer (8) are horizontally fitted to the main casing (1) by turning the meter by 90°, that is, the three thermometers arranged in transverse direction on the thermometer unit are directed in the vertical direction, the thermometer unit can be vertically slanted with a predetermined angle in connection with the front surface of the casing (1). With this structure, the disadvantage that when the display unit is fixed on the outer surface of the casing, it is difficult for a user to read a correct scale of temperature dependent upon position of the ventilation device, is avoided.

Thus, in accordance with the embodiment of the present invention, the thermometer unit (8) can be turned in the vertical or horizontal direction in connection with the outer surface of the main casing even though the ventilation device is placed at any position whereby the thermometer unit (8) can be directed to a user so that correct temperature are easily readable and reliability on the device is increased.

FIGS. 5 to 7 illustrate an embodiment of attachment of the thermosensitive elements (6a)-(6c) to the frame (3). The frame (3) is adapted to surround the heat exchanger (2) and includes the inlet plane of an air-feeding passage (2e), the outlet plane of an air-feeding passage (2g) and the inlet plane (2f) of an air-discharging passage (2f). Each slide plate (9a), (9b), (9c) (the slide plate (9a) is not shown) is provided on each plane (2e), (2f), (2g) so as to be slidable in the direction of the arrow mark A. Each slide plate (9a), (9b), (9c) has both ends (only one end is shown) which are slidably fitted in grooves (10) formed in parallel to the adjacent edges of the frame (3). Each groove (10) is provided with a fitting element such as a screw (11) to secure the slide plate (9a), (9b), (9c) at a desired position in the slidable region. As shown in FIG. 7, both ends of the slide plates (9a)-(9c) in the longitudinal direction are bent in the shape of a channel in cross section to form a pair of grooves (12) in which sliding pieces (13a), (13b), (13c) having a convex shape in cross section are respectively fitted so as to be slidable in the direction of the arrow mark B, the sliding pieces (13a), (13b), (13c) being retained in a desired position in the groove (12). In the FIGS. 5-7, the sliding piece (13a) is not shown. A through-hole is formed in the projecting portion of the sliding pieces (13a), (13b), (13c) so that a stick-like thermometers (6a)-(6c) are fitted into the corresponding holes.

Thus, the sliding pieces (13a)-(13c) holding the thermosensitive elements (6a)-(6c) and the slide plates (9a)-(9c) holding the sliding pieces (13a)-(13c) are slidably moved and can be retained at a desired position, and accordingly, the thermosensitive elements (6a)-(6c) can be retained at a desired position on the inlet and outlet planes of the passages. This arrangement is satisfactory with various conditions of restriction in a specification such as the shape of main casing (1), the position at which the heat exchanger 2 is mounted and the length of the guide tubes (7a)-(7c).

FIG. 8 illustrates another embodiment of the frame having legs for fitting the thermosensitive elements.

Legs (3e), (3f), (3g) for fitting the thermosensitive elements are respectively formed at a desired position of the frame (3) in one piece, that is, the leg (3e) is formed near the inlet of the air-feeding passage (2e) of the heat exchanger, the leg (3f) near the inlet of the air-discharging passage (2f) and the leg (3g) near the outlet of the air-feeding passage (2g). Thus, the thermosensitive elements (6a)-(6c) are directly fitted to the frame (3) which supports the heat exchanger (2) whereby a special fitting part is unnecessary taking advantage of low cost.

Figure 9:
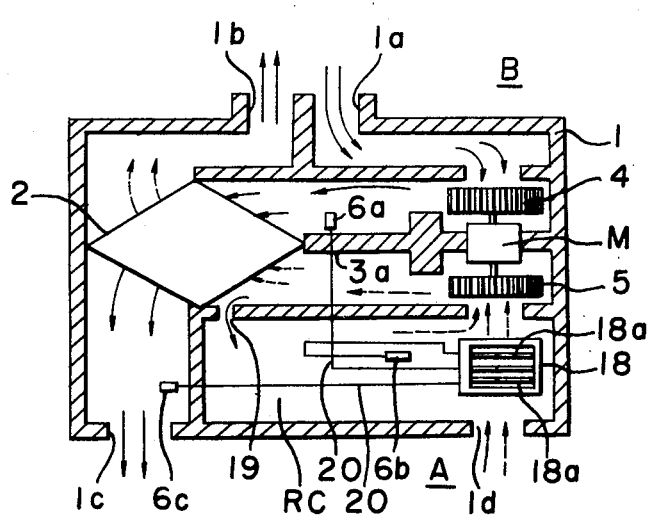
FIGS. 9 and 10 are respectively schematic views of modified embodiments of the ventilation device of the present invention.

FIG. 9 illustrates still another embodiment of the present invention which has an improved arrangement of the thermosensitive elements of a liquid expansion type thermometer unit. In the figure, the character M designates a motor for actuating the air feeding blower (4) and the discharging blower (5), (19) designates a by-pass passage and RC designates a constant temperature chamber. The liquid expansion type thermometer unit (18) holds three temperature indicating tubes (18a) made of glass which are positioned side by side. Each indicating tube (18a) is connected to each thermosensitive element (6a), (6b) or (6c) through a capillary tube (20) filled with liquid which expands dependent on temperature rise. The capillary tubes (20) all have the same inner diameter and the same length. When the ventilation device having the structure described above is operated, an outdoor temperature, a room temperature and a fed air temperature are indicated on the thermometer unit (18) through the respective thermosensitive elements (6a), (6b), (6c). A part of discharged air is fed into the constant temperature chamber RC through the by-pass passage (19) to urge room air which tends to stay thereby positively equalizing temperature distribution of all the capillary tubes (20).

Generally, in case of using a thermometer to confirm heat exchange function by eyes, it is important to correctly indicate temperature difference in the measuring points located at plurality of positions. That is, measuring temperature is varied depending on a position where the capillary tube is located because the position of the capillary tube is different for each measuring point whereby expansion of liquid contained in the tubes varies. Therefore, if temperature at positions where the capillary tubes is not equalized, correct indication of the temperature for each measuring points may not be attained.

In the embodiment illustrated in the FIG. 9, temperature circumstance of the position where the capillary tubes (20) are located is substantially equalized, whereby temperature distribution for the whole length of the capillary tubes (20) can be equalized and the temperature at each measuring point can be accurately measured to correctly confirm heat exchange function of the device.

Figure 10:
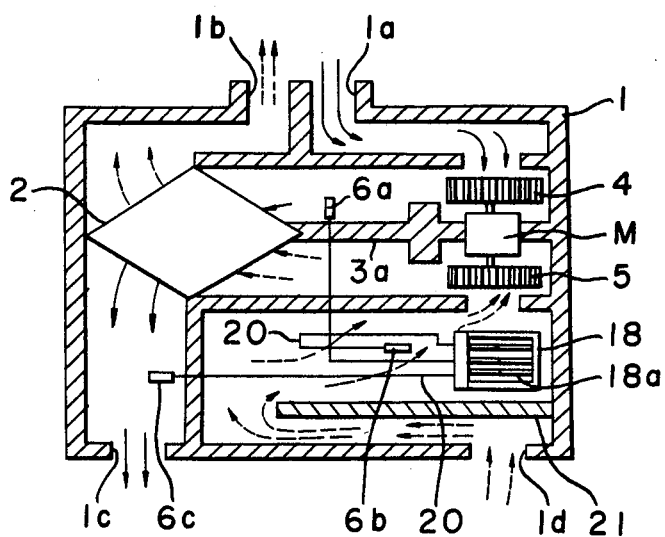

FIG. 10 illustrates an embodiment of the present invention, similar to that of the FIG. 9, for improving arrangement of thermosensitive elements. The embodiment aims to equalize the temperature circumstance of the position where the capillary tubes (20) are located as similar to the embodiment of the FIG. 9. In the figure, the reference numeral (21) designates a guide wall formed in the casing (1).

When the ventilation device having structure described above is operated, discharged air, sucked through the discharge port (1d) to flow to the heat exchanger (2), is forcibly contacted to the entire surface of the capillary tubes (20) by means of the guide wall (21) whereby the temperature of the capillary tubes (20) is equalized at any point in the longitudinal direction of the tube. That is, temperature distribution of each capillary tube (20) is equalized, thus the temperature in each measuring point can be correctly indicated.

A liquid expansion type thermometer is used in the embodiment shown in FIGS. 9 and 10. It is possible to attain the same effect even though gas or solid expansion type thermometer is used.

Obviously, numerous modifications and variations of the present invention are possible in light of the above teachings. It is therefore to be understood that within the scope of the appended claims, the invention may be practiced otherwise than as specifically described herein.

I claim:

1. A ventilation device including a heat-exchanging means, said heat-exchanging means including an air-feeding passage having an inlet and an outlet and an air-discharging passage having an inlet and an outlet, comprising:

a first thermosensitive element placed at said inlet of said air-feeding passage to detect an outdoor air temperature;

a second thermosensitive element placed at said outlet of said air-feeding passage such that a fed air temperature is detected after the outdoor air has been thermally conditioned by said heat-exchanging means as the outdoor air circulates through said air-feeding passage of said heat-exchanging means;

a third thermosensitive element placed at said inlet of said air-discharging passage such that a room air temperature is detected prior to the room air being thermally conditioned by said heat-exchanging means as the room air circulates through said air-discharging passage of said heat-exchanging means to exit via said outlet of said air-discharging passage; and a display unit for showing said outdoor air temperature, said fed-air temperature and said room air temperature detected by said first thermosensitive element, said second thermosensitive element and said third thermosensitive element, respectively.

2. A ventilation device according to claim 1 wherein said display unit is supported by a main casing of said heat exchanger so as to be slanted in connection with the outer surface of said casing.

3. A ventilation device according to claim 1 wherein said first, second and third thermosensitive elements are placed so as to be slidable and retained at a desired position near said inlet of said air-feeding passage, said inlet of said air-discharging passage and said outlet of said air-feeding passage.

4. A ventilation device according to claim 1 wherein said first, second and third thermosensitive elements are fixedly mounted on a frame of said heat exchanging means near said inlet of said air-feeding passage, said inlet of said air-discharging passage and said outlet of said air-feeding passage.

* * * * *